3,153,036
PHOSPHOROUS ACID ESTERS DERIVED FROM TRANSESTERIFICATION OF PHOSPHITE TRIESTERS WITH MONO-, DI-, AND TRISACCHARIDES

Rudolf Merten, Cologne-Flittard, Hans Holtschmidt, Cologne-Stammheim, and Günter Oertel, Cologne-Flittard, Germany, assignors to Farbenfabriken Bayer Aktiengesellschaft, Leverkusen, Germany, a corporation of Germany
No Drawing. Filed Aug. 28, 1962, Ser. No. 220,075
Claims priority, application Germany Sept. 4, 1961
3 Claims. (Cl. 260—234)

This invention relates to phosphorous acid esters and more particularly to phosphorous acid ester polyols.

The reaction of trialkyl phosphites with glycols has been proposed heretofore, but these reactions are known to lead to cyclic triesters of phosphorous acid. U.S. Patent 2,841,608 describes the transesterification of triphenyl phosphite with ethylene glycol in the molecular ratio of two mols of phosphite per mol of glycol and discloses that the reaction leads to the following compound:

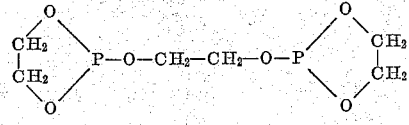

According to U.S. Patent 2,961,454 the bicyclic phosphite of the formula:

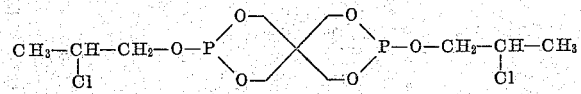

is obtained in similar manner from 2 mols of tri-(2-chloropropyl) phosphite and 1 mol of pentaerythritol.

These cyclic triesters of phosphorous acid do not have free hydroxyl groups and their use, therefore, as reactive intermediates in chemistry requiring the presence of free hydroxyl groups, is impossible. These compounds prepared by the prior art methods are not useful in the preparation of epoxide resins, for example.

It is therefore an object of this invention to provide phosphorous acid esters having free hydroxyl groups. A further object of this invention is to provide substantially water-white, essentially colorless oils based on phosphorous acid which have free hydroxyl groups suitable for the preparation of plastics through polyaddition reactions. Still another object of this invention is to provide an improved process for the preparation of phosphorous acid esters which have free hydroxyl groups. A further object of the invention is to provide esters of phosphorous acid which are substantially free of cyclic linkages caused by the transesterification of trialkyl phosphites with glycerine. Another object of the invention is to provide a process for the preparation of phosphorous acid esters while avoiding cyclicization.

The foregoing objects and others which will become apparent from the following description are accomplished in accordance with the invention, generally speaking, by providing phosphorous acid esters containing at least two phosphite groupings in the molecule and having free hydroxyl groups prepared by a process which comprises reacting a carbohydrate having at least four carbon atoms with a trialkyl phosphite. Therefore, this invention contemplates phosphorous acid esters having free hydroxyl groups which are substantially colorless and have a relatively low viscosity.

Any suitable carbohydrate may be used in spite of their generally poor solubility in organic media, and their low stability with respect to high temperatures and chemical reagents. The carbohydrates are transformed by transesterification into esters of phosphorous acid without the decomposition which normally occurs, due to decomposition reactions or aldehyde or ketone functional combinations. Due to steric hindrances, the structure of the resulting phosphorous acid esters is such that they show very little tendency toward crystallization. While some of them may have a relatively high viscosity they are suitable for use in the production of plastics.

Any suitable carbohydrate may be used for the production of the polyols of the invention which are suitable for further reaction with organic polyisocyanates to prepare polyurethane plastics, provided that the carbohydrate contains at least four carbon atoms. The term "carbohydrate" as used herein refers to compounds composed of carbon, hydrogen and oxygen corresponding to the formula $C_x(H_2O)_y$ wherein $x$ and $y$ are whole integers and thus the compounds are monosaccharides when $x$ and $y$ are 4 to 7, disaccharides when $x$ is 12 and $y$ is 11, trisaccharides when $x$ is 18 and $y$ is 16 and polysaccharides when $x$ and $y$ are integers greater than 18. In other words, the bioses and trioses are excluded because they do not contain at least four carbon atoms, but any other suitable carbohydrate may be used including such monosaccharides as tetroses for example erythrose, erythrulose, and the like; pentoses for example arabinose, xylose, ribose, arabinulose and the like; hexoses for example glucose, galactose, mannose, fructose, sorbose and the like; heptoses for example mannoheptose and the like; disaccharides such as lactose, maltose, sucrose, melibiose, trehalose, cellubiose and the like; trisaccharides such as raffinose, melezitose and the like; tetrasaccharides such as lupeose, stachyose, cellotetraose, and the like; polysaccharides including the dextrin, the starches, and the like. In some cases it is necessary to treat the polysaccharides with acid catalysts and perhaps under pressure in order to bring them into a soluble form. In addition to the pure carbohydrates, condensates obtained by the condensation of formaldehyde under alkaline conditions and known as formose may be used. It is possible for a formose which contains unreacted formaldehyde to be reacted directly with an alcohol or a phenol to prepare the polyols of the invention. Carbohydrates originally containing at least 4 carbon atoms which have been partially modified by reacting at their hydroxyl and/or carbonyl groups may also be used such as, for example, the partial acylation products, alkylation products, sugar anhydrides, sugar acids, acetalization or ketalization products of carbohydrates may also be used in the process of the invention. Of course, where acetalization or ketalization products are used they need only be modified with the alcohols or phenols to prepare the polyols of this invention. Any of the modified compounds may be used provided they contain at least one free hydroxyl group in the molecule.

The term "trialkyl phosphite" as used herein and in the claims includes any compound having the formula $P(OR)_3$ wherein R is an alkyl haloalkyl, aralkyl, cyclo or haloaralkyl radical. Any suitable trialkyl phosphite may be used, such as, for example, trimethyl phosphite, triethyl phosphite, tripropyl phosphite, tributyl phosphite, methyl diethyl phosphite, butyl diethyl phosphite, tricyclohexyl phosphite, tri-(2-chlorocyclohexyl)-phosphite, cyclohexyl di-(2-chlorocyclohexyl)-phosphite, tri-(beta-chloroethyl-phosphite, tri-(2-bromopropyl)-phosphite, tri-(2-chloropropyl)-phosphite, tri-(benzyl)-phosphite, benzyl dimethyl phosphite, tri-(4-chlorobenzyl)-phosphite, tri-(4-bromo benzyl)-phosphite. The preferred trialkyl phosphite because of commercial availability and ease of reaction, is tri-(beta-chloroethyl)-phosphite.

It is also possible in the production of the phosphorous acid esters containing at least two phosphite groupings in accordance with the present invention, to use polyhydric alcohols in addition to the carbohydrates. For this purpose, you may use sufficient carbohydrate so that the final product contains at least about 5% by weight of incorporated carbohydrate and preferably more than about 10% by weight of incorporated carbohydrate. Moreover, the product is preferably transesterified until the final product has a phosphorous content of at least about 0.5% by weight and preferably more than about 1% by weight. Any suitable polyhydric alcohol may be used. It is preferred to use those polyhydric alcohols which have from 2 to 6 hydroxyl groups and a molecular weight below about 5000. Most preferred are the polyalkylene ethers having 2 to 4 hydroxyl groups such as, for example, diethylene glycol, triethylene glycol, tetramethylene glycol, the reaction product of one mol of glycerine with 3 mols of ethylene oxide. The reaction product of 1 mol of pentaerythritol with 3 mols of propylene oxide, polypropylene ether glycol, such as, for example, polypropylene ether glycol having a molecular weight of 250 and the like. Other suitable alcohols, having 2 to 6 hydroxyl groups and having a molecular weight below about 5000 are, for example, propylene glycol, 1.4-butane diol, 1,6-hexane diol, 1,4-butene diol, 1,4-butine diol, oxyalkylated phenols such as, for example, the reaction product of hydroquinone with 2 mols of ethylene oxide to produce the bis-(beta hydroxy ethyl) ether of hydroquinone, amino alcohols having only free hydroxyl groups such as N-methyl diethanol amine, triethanol amine, and the like, hydroxy alkyl esters of polycarboxylic acid, such as, for example, the reaction product of 2 mols of 1,3-propylene glycol with 1 mol of adipic acid. The reaction product of 3 mols of ethylene glycol with 1 mol of 1,3,5-benzene tricarboxylic acid. The reaction product of 2 mols of 1,4-butane diol with 1 mol of sebacic acid, 2,2'-dihydroxy dialkyl sulphides and disulphides such as, for example, thiodiglycol, bis-beta hydroxy ethyl disulphide, and the like. In addition, one may use polyhydroxyl esters and polyhydric polyethers which have a molecular weight below about 5000 prepared from the condensation of an excess of polyhydric alcohol such as ethylene glycol, propylene glycol, 1,4-butane diol, trimethylol propane, glycerine, pentaerythritol and the like, with a polycarboxylic acid such as, for example, adipic acid, succinic acid, sebacic acid, benzene dicarboxylic acid, and the like, or by the condensation of an alkylene oxide such as, for example, ethylene oxide, propylene oxide, 1,2-butylene oxide, styrene oxide, epichlorohydrin either alone or with one of the polyhydric alcohols disclosed for the preparation of polyesters.

Some polyhydric alcohols such as ethylene glycol, trimethylene glycol, trimethylol propane, 1,3,6-hexane triol, pentaerythritol, glycerine, 1-pentachloro phenyl ether, sorbitol, mannitol, can also be used, but they are not preferred since they exhibit more tendency to ring closure with the trialkyl phosphite. The preferred polyhydric alcohol having from 2 to 4 free hydroxyl groups are polyalkylene ether polyols such as diethylene glycol, triethylene glycol and the reaction product of pentaerythritol with 3 mols ethylene glycol. The polyhydric alcohol may be substituted with various radicals such as halogen, for example, chlorine, bromine, iodine or the like; nitro, alkoxides such as methoxy, ethoxy or the like, carboxylic acid esters such as carbomethoxy, carbethoxy and the like. Small amounts of amines such as ethyl amine, ethylene diamine, amino alcohols such as ethanol amine and monohydric alcohols such as octanol, stearyl alcohol and the like can also be used. Where mixtures of the carbohydrates and the alcohols are used they are preferably employed in the form of solutions of the carbohydrate in the alcohol as described in Belgian Patent 596,556. Moreover, these mixtures may be modified by initial condensation with aldehydes such as formaldehyde in the presence of an acid catalyst such as HCl as described in Belgian Patent 597,543.

The transesterification between trialkyl phosphites and carbohydrates according to the present process is preferably effected as far as possible with exclusion of water in order to avoid a hydrolysis of the trialkyl phosphites to dialkyl phosphites. The reaction temperature is preferably within the range of from about 50–180° C.; most preferably 50–120° C.

Catalysts are generally not necessary during the transesterification, but alkali or even acid catalysts can be used, such as, for example, sodium hydroxide, potassium hydroxide, $HBF_4$, HCl and the like. The reactants can be combined in any desired order but it is preferred to add the trialkyl phosphite to the carbohydrate or mixture thereof with a polyhydric alcohol. The addition is preferably carried out dropwise with simultaneous removal of the alcohol produced in the transesterification.

The phosphorous acid esters of the invention preferably have a hydroxyl number within the range of from about 30 to 800. They are generally water white, essentially colorless, condensation products, which have low tendency toward crystallization and which can be used advantageously as intermediates in the production of epoxide resins and as lubricants. Moreover, they are suitable as plasticizers and stabilizers for polymers which contain halogen. In particular, they may be used as lubricants where substantially nonflammable lubricants are required, such as, for example, in the lubrication of moving parts of stokers, and the like.

The invention is further illustrated by the following examples, in which the parts are by weight unless otherwise indicated.

*Examples 1–5*

About 686 parts of cane sugar are mixed with the indicated parts of polyethylene glycol and about 343 parts of water (about 50% of the actual quantity of cane sugar) and heated with about 0.1% by weight of 30% (aqueous) $HBF_4$, calculated on the total of cane sugar and polyglycol, for about 4 hours to about 90° C. At about 90° C. the water is distilled off under partial vacuum. Tri-chloroethyl phosphite is then added dropwise at about 80° C. at the rate at which the ethylene chlorohydrin distils off. Towards the end, the temperature is raised to about 90° C. and is maintained altogether for about 6 to 8 hours at about 15 mm. Hg and about 90° C. The cane sugar phosphites are obtained in the form of viscous condensates.

| | Parts Polyglycol | Parts Tri-Chloro-Ethyl Phosphite | Yield (parts) | Percent P | Percent Cl | Percent OH | Viscosity, cp./25° C. |
|---|---|---|---|---|---|---|---|
| 1 | 1,200 Triethylene glycol. | 1,080 | 2,183 | 5.8 | 2.15 | 14.6 | 7,320 |
| 2 | 1,500 Triethylene glycol. | 1,350 | 2,505 | 5.3 | 4.8 | 21.4 | 3,550 |
| 3 | 848 Diethyleneglycol. | 2,160 | 2,180 | 11.0 | 7.6 | 12.4 | 100,000 |
| 4 | 750 Triethylene glycol. | 1,350 | 1,864 | 8.2 | 4.9 | 13.7 | 100,000 |
| 5 | 300 Triethylene glycol. | 1,080 | 1,411 | 9.2 | 8.5 | 14.7 | Highly viscous |

*Example 6*

About 343 parts of cane sugar, about 410 parts of 40% (aqueous) formaldehyde, about 424 parts of diethylene glycol, and about 1 ml. of $HBF_4$ are heated for about 4 hours to about 90° C. and then the water formed in the reaction and added water is removed under partial vacuum at about 90° C. Approximately another 212 parts of diethylene glycol and about 270 parts of tri-(beta-chloroethyl)-phosphite are added at about 90° C. and the volatile fractions are distilled off at the same temperature and at about 15 mm. Hg. As reaction product, there are obtained about 1120 parts of a yellow condensate, about 14.1% —OH, acid number about 11.4, about 1.8% P, about 2.2% Cl, viscosity about 10,000 cp./25° C.

Example 7

About 686 parts of cane sugar, about 410 parts of 40% (aqueous) formaldehyde, about 600 parts of triethylene glycol and about 1.5 parts of 30% (aqueous) $HBF_4$ are stirred for about 4 hours at about 90° C. and then concentrated by evaporation under partial vacuum at about the same temperature. About 600 parts of triethylene glycol and about 540 parts of tri-chloroethyl phosphite are added at about 70° C. and concentrated to about 15 mm. Hg. Towards the end of the condensation, the temperature is raised to about 90° C. As reaction product, there are obtained about 208 parts of a light yellow phosphite acetal. About 14.0% —OH, about 3.9% Cl, about 5.4% P, viscosity about 6120 cp./25° C.

Example 8

About 328 parts of starch are boiled with about 500 parts of 2% (aqueous) hydrochloric acid for about 6 hours under reflux, then about 675 parts of a technical linear polyethylene glycol with about 20.2% —OH are added and concentrated at about 90° C. under partial vacuum. A total of about 1080 parts of tri-chloroethyl phosphite are added dropwise under partial vacuum at about 90° C. in proportion as the ethylene chlorohydrin distils off and the mixture is finally kept for about 4 hours at about 90° C./12 mm. Hg. About 1477 parts of a brown phosphite are obtained. Viscosity about 21,500 cp./25° C.; about 13.5% —OH; acid number about 1.8; about 8.0% P; about 11.4% Cl.

Example 9

About 360 parts of grape sugar (glucose) and about 675 parts of the polyethylene glycol of Example 8 are mixed at about 80° C. under partial vacuum and while simultaneously distilling off ethylene chlorohydrin with a total of about 1080 parts of tri-chloroethyl phosphite in about 15 hours. The mixture is kept for approximately another 6 hours at about 90° C./12 mm. Hg and there are obtained about 1364 parts of a light yellow phosphite with about 14.3% —OH; acid number about 6; viscosity about 34,000 cp./20° C.; about 8.5% P; about 7.1% Cl.

Example 10

About 343 parts of cane sugar, about 236 parts of hexane-1,6-diol, about 250 parts of water and about 0.5 part of 30% (aqueous) $HBF_4$ are heated for about 4 hours to about 90° C. then concentrated by evaporation at about 90° C. and about 540 parts of tri-chloroethyl phosphite are added dropwise in about 10 hours at about 90° C./12 mm. Hg. The mixture is kept for approximately another 4 hours at about 90° C./12 mm. Hg and there are obtained about 757 parts of a light yellow viscous phosphite. About 17.7% —OH; about 7.8% P; about 5.5% Cl.

Example 11

About 343 parts of cane sugar and about 200 ml. of water are inverted with about 0.1 part of 30% (aqueous) $HBF_4$ for about 4 hours at about 100° C., then about 268 parts of diethylene glycol monoethylether are added and the mixture is concentrated by evaporation at about 90° C./12 mm. Hg. About 360 parts of tri-chloroethyl phosphite are also added at about 90° C./12 mm. Hg in about 6 hours, these conditions being maintained for approximately another four hours. About 552 parts of a highly viscous phosphite are obtained. About 10.8% —OH; about 6.2% P.

It is to be understood that the foregoing working examples are for the purpose of illustration, and that any other suitable trialkyl phosphite, carbohydrate or the like could have been used therein provided the teachings of this disclosure were followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. Phosphorous acid esters containing at least two phosphite groups per molecule and containing free hydroxyl groups prepared by a process which comprises reacting at least about 0.5 percent by weight of a phosphite having the formula $P(OR)_3$ wherein R is selected from the group consisting of alkyl having 1 to 6 carbon atoms, haloalkyl having 1 to 6 carbon atoms, cycloalkyl having 1 to 6 carbon atoms, benzyl and halobenzyl, halo in each instance being selected from the group consisting of chlorine and bromine, with a member selected from the group consisting of mono-, di- and trisaccharides having from 4 to 18 carbon atoms at a temperature of from about 50° C. to 180° C. with the exclusion of water until a phosphite polyol is obtained having an hydroxyl number of from about 30 to about 800.

2. The phosphorous acid ester of claim 1 wherein glucose is the saccharide.

3. The phosphorous acid ester of claim 1 wherein the phosphite is trichloroethyl phosphite.

References Cited in the file of this patent

UNITED STATES PATENTS

| | | |
|---|---|---|
| 2,256,380 | Dickey | Sept. 16, 1941 |
| 2,353,558 | Gzemski | July 11, 1944 |
| 2,643,261 | Matuszak et al. | June 23, 1953 |
| 2,961,454 | Gould et al. | Nov. 22, 1960 |
| 2,981,730 | Martin et al. | Apr. 25, 1961 |
| 3,053,878 | Friedman et al. | Sept. 11, 1962 |
| 3,081,331 | Friedman et al. | Mar. 12, 1963 |

OTHER REFERENCES

Petrov et al.: U.S.S.R. 136, 347, July 7, 1960.